United States Patent
Garcia Becerro et al.

(10) Patent No.: US 10,672,112 B2
(45) Date of Patent: Jun. 2, 2020

(54) METHOD AND SYSTEM FOR REAL-TIME NOISE REMOVAL AND IMAGE ENHANCEMENT OF HIGH-DYNAMIC RANGE IMAGES

(71) Applicant: IEE International Electronics & Engineering S.A., Echternach (LU)

(72) Inventors: Frederic Garcia Becerro, Belvaux (LU); Cedric Schockaert, Waldbilling (LU); Bruno Mirbach, Konz (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 52 days.

(21) Appl. No.: 15/555,187

(22) PCT Filed: Mar. 2, 2016

(86) PCT No.: PCT/EP2016/054448
§ 371 (c)(1),
(2) Date: Sep. 1, 2017

(87) PCT Pub. No.: WO2016/139260
PCT Pub. Date: Sep. 9, 2016

(65) Prior Publication Data
US 2018/0053289 A1    Feb. 22, 2018

(30) Foreign Application Priority Data
Mar. 5, 2015    (LU) .......................................... 92673

(51) Int. Cl.
*G06T 5/00*    (2006.01)
*G06T 5/40*    (2006.01)
*G06T 5/20*    (2006.01)

(52) U.S. Cl.
CPC .............. *G06T 5/009* (2013.01); *G06T 5/002* (2013.01); *G06T 5/20* (2013.01); *G06T 5/40* (2013.01);
(Continued)

(58) Field of Classification Search
CPC    G06T 5/009; G06T 5/002; G06T 5/20; G06T 5/40; G06T 2207/20192; G06T 2207/20208
See application file for complete search history.

(56) References Cited

U.S. PATENT DOCUMENTS

| | | | |
|---|---|---|---|
| 8,625,921 B1* | 1/2014 | Kokemohr | .............. G06T 5/001 |
| | | | 382/260 |
| 2005/0031200 A1* | 2/2005 | Lee | .......................... G06T 5/009 |
| | | | 382/169 |

(Continued)

OTHER PUBLICATIONS

Durand et al., "Fast Bilateral Filtering for the Display of High-Dynamic-Range Images," ACM Trans. Graph., vol. 21, No. 3, 2002, pp. 257-266.

(Continued)

*Primary Examiner* — Pinalben Patel
(74) *Attorney, Agent, or Firm* — Reising Ethington P.C.

(57) ABSTRACT

A method and system for real-time noise removal and image enhancement of high-dynamic range (HDR) images. The method includes receiving an HDR input image I and operating processing circuitry for (i) applying a first edge-preserving filter (e.g. guided filter) to the input image I, thereby generating a first image component $B_1$ and a first set of linear coefficients $\bar{a}_{i,1}$; (ii) applying a second edge-preserving filter (e.g. guided filter) to the input image I, thereby generating a second image component $B_2$ and a second set of linear coefficients $\bar{a}_{i,2}$; (iii) generating a plausibility mask P from a combination of the first set of linear coefficients $\bar{a}_{i,1}$ and the second set of linear coeffi- (Continued)

cients $\bar{a}_{i,2}$, the plausibility mask P indicating spatial detail within the input image I; and (iv) generating an output image O based on first image component $B_1$, the second image component $B_2$ and the plausibility mask P.

21 Claims, 5 Drawing Sheets

(52) U.S. Cl.
CPC ............... *G06T 2207/20192* (2013.01); *G06T 2207/20208* (2013.01)

(56) References Cited

U.S. PATENT DOCUMENTS

| | | | |
|---|---|---|---|
| 2005/0089239 A1 | 4/2005 | Brajovic | |
| 2008/0122953 A1 | 5/2008 | Wakahara et al. | |
| 2008/0267530 A1* | 10/2008 | Lim | H04N 5/235 382/284 |
| 2010/0260432 A1* | 10/2010 | Shimizu | G06T 5/002 382/255 |
| 2011/0142351 A1* | 6/2011 | Chen | G06T 5/004 382/199 |
| 2011/0229029 A1* | 9/2011 | Kass | G06T 5/002 382/168 |
| 2012/0057803 A1 | 3/2012 | Wakazono | |
| 2014/0050417 A1* | 2/2014 | Jiang | G06K 9/40 382/261 |
| 2015/0023594 A1 | 1/2015 | Zhang et al. | |
| 2015/0071562 A1* | 3/2015 | Yasutomi | G06T 5/002 382/264 |
| 2015/0254523 A1* | 9/2015 | Nakamura | G06T 5/004 382/199 |
| 2016/0180504 A1* | 6/2016 | Kounavis | G06T 5/002 348/241 |
| 2016/0275675 A1* | 9/2016 | Nakajima | G06T 7/11 |
| 2019/0208106 A1* | 7/2019 | Lukac | G06T 5/20 |

OTHER PUBLICATIONS

Glushko et al., "Quantitative analysis of infrared contrast enhancement algorithms," in Infrared Imaging Systems: Design, Analysis, Modeling, and Testing, 2007, pp. 65 430S: 1-12.

Farbman et al., "Edge-preserving decompositions for multi-scale tone and detail manipulation", ACM Transactions on Graphics, vol. 27, No. 3, Aug. 2008, pp. 1-5.

Zuo et al., "Display and detail enhancement for high-dynamic-range infrared images," Optical Engineering, vol. 50, No. 12, Nov. 18, 2011, pp. 127 401: 1-9.

He et al., IEEE Transactions on Pattern Analysis and Machine Intelligence, vol. 35, No. 6, Jun. 2013, pp. 1397-1409.

International Search Report for International application No. PCT/EP2016/054448 dated May 3, 2016, 4 pages.

Written Opinion for International application No. PCT/EP2016/054448 dated May 3, 2016, 5 pages.

\* cited by examiner

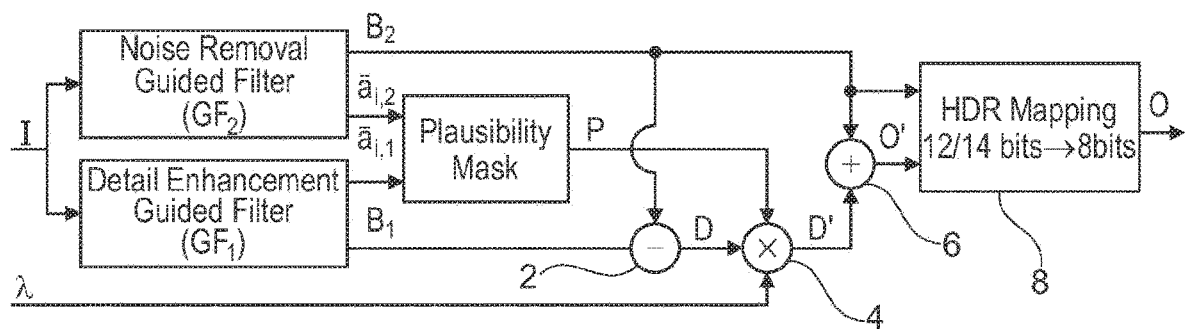
Fig. 1
(a) I
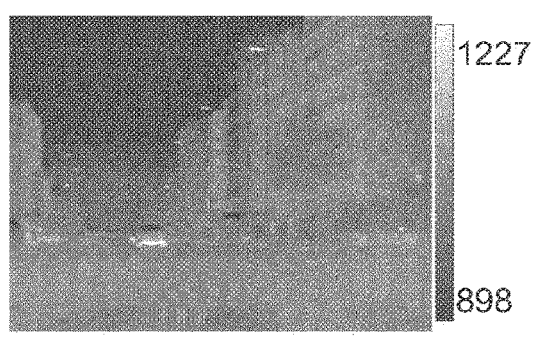
(b) $B_1$, (k=3, $\varepsilon_1$ =25)
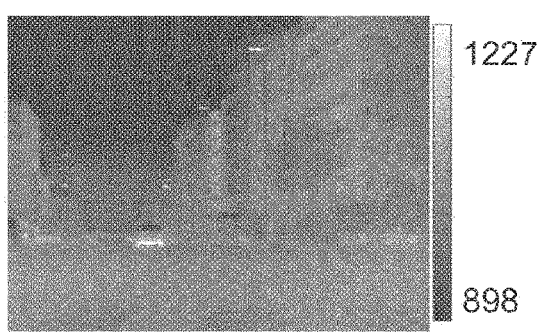
(c) $B_2$, (k=3, $\varepsilon_2$ =2500)
Fig. 2

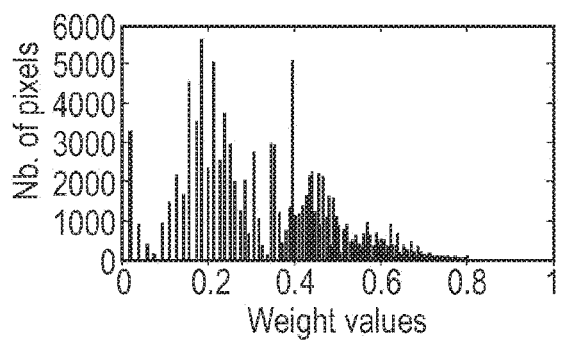
(a) $\bar{a}_{i,1}$, (k=3, $\varepsilon_1$=25)    (b) Histogram of $\bar{a}_{i,1}$
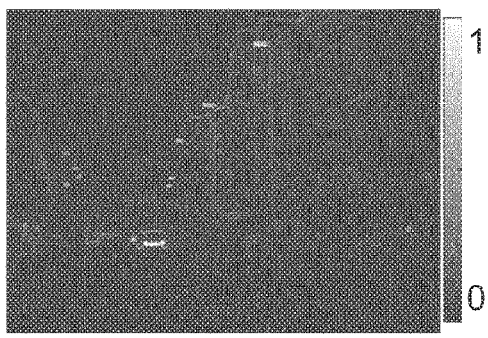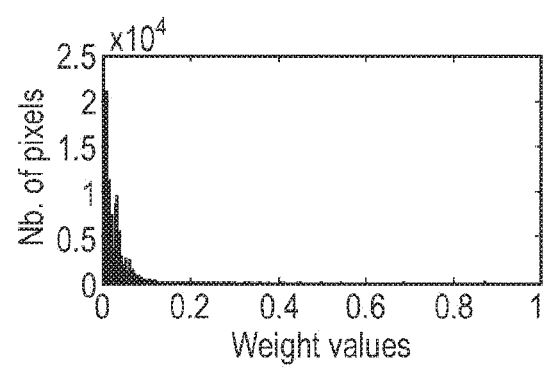
(c) $\bar{a}_{i,2}$, (k=3, $\varepsilon_2$=2500)    (d) Histogram of $\bar{a}_{i,2}$
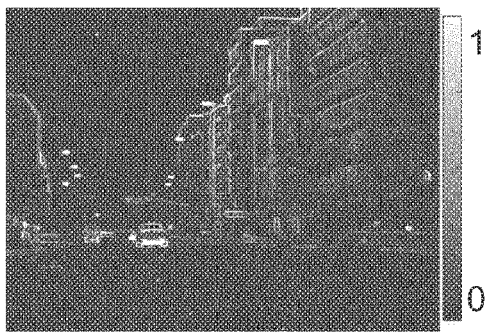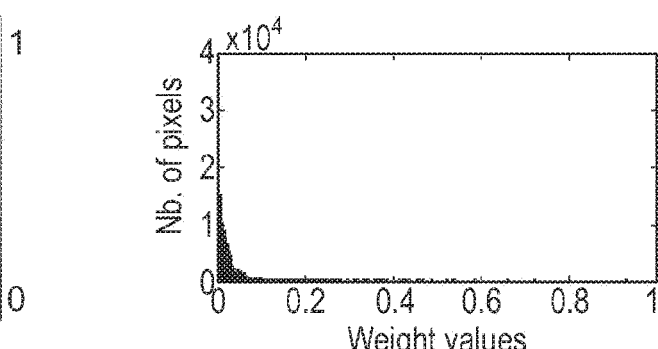
(e) P    Fig. 3    (f) Histogram of P
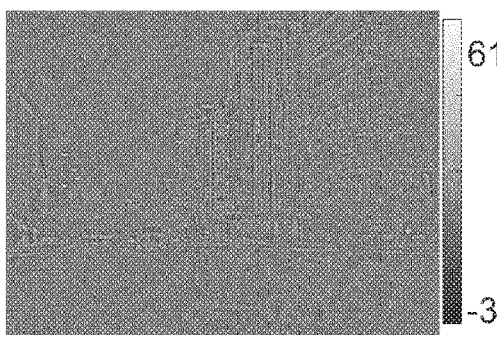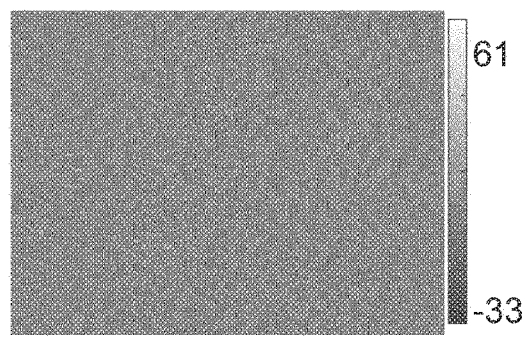
(a) D    Fig. 4    (b) D', ($\lambda$ = 1)

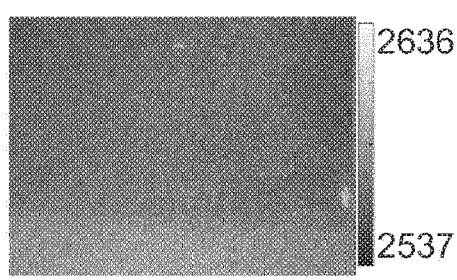
(a) Test 1, I
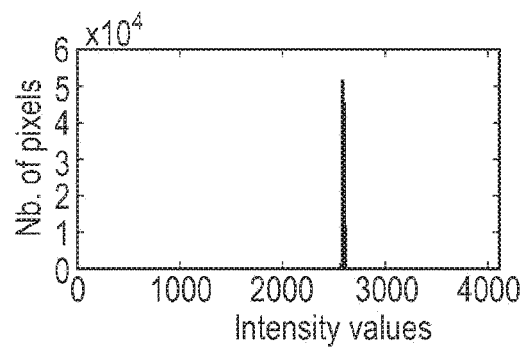
(b) Histogram of (a)
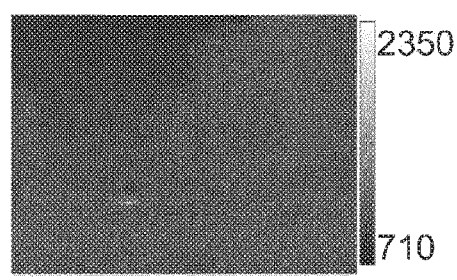
(c) Test 2, I
Fig. 5
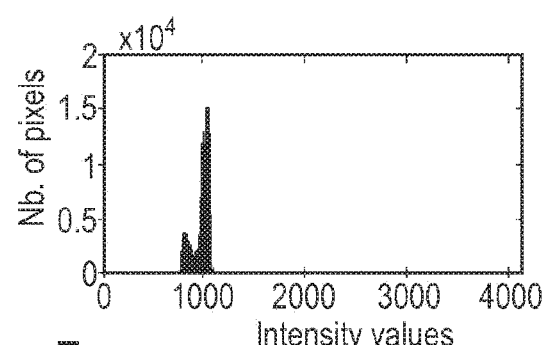
(d) Histogram of (c)
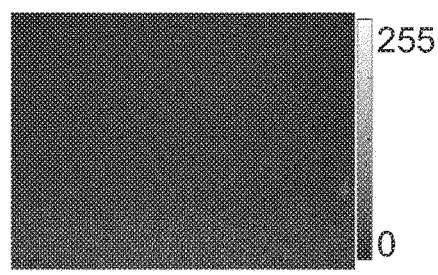
(a) O, ($\alpha=1$, $\beta=25$)
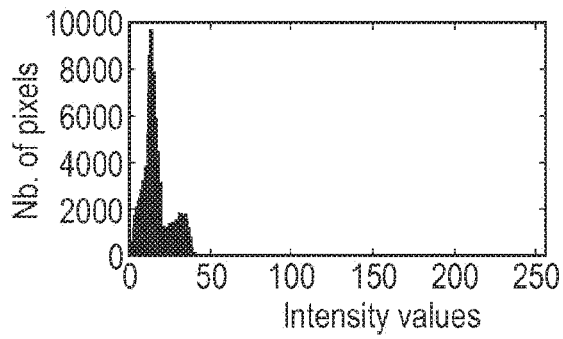
(b) Histogram of (a)
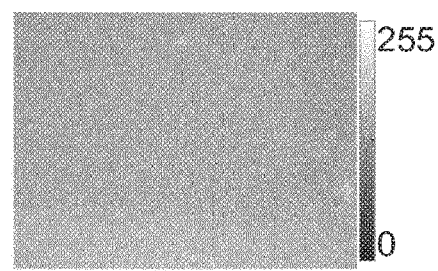
(c) O, ($\alpha=1$, $\beta=150$)
Fig. 6
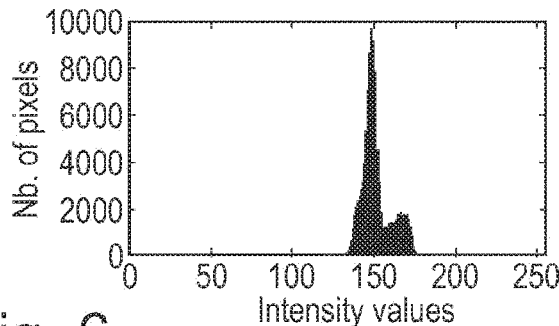
(d) Histogram of (c)

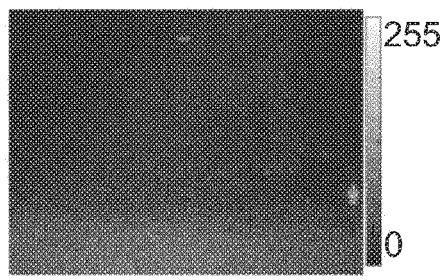
(a) O, (α=3, β=25)
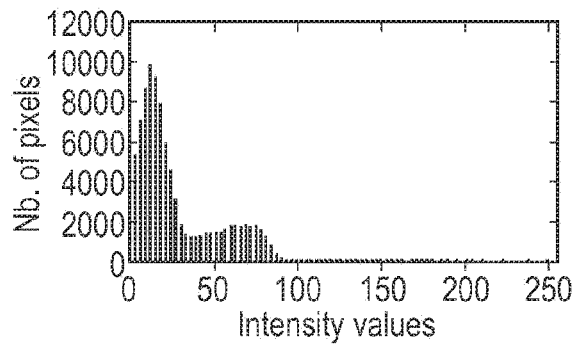
(b) Histogram of (a)
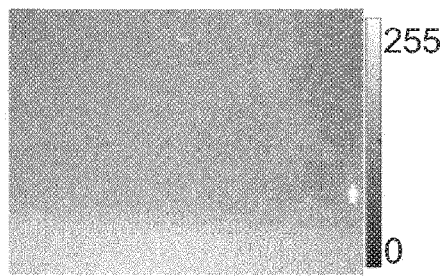
(c) O, (α=3, β=150)
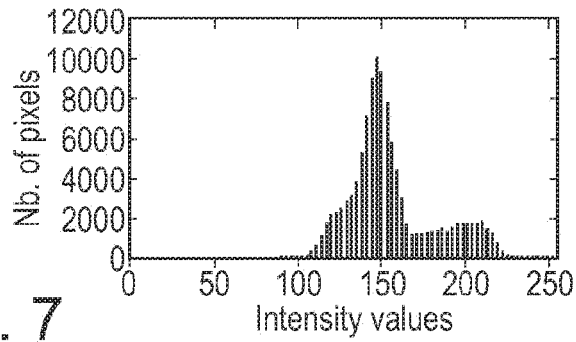
(d) Histogram of (c)
Fig. 7
(a) O, (α=1, β=25)
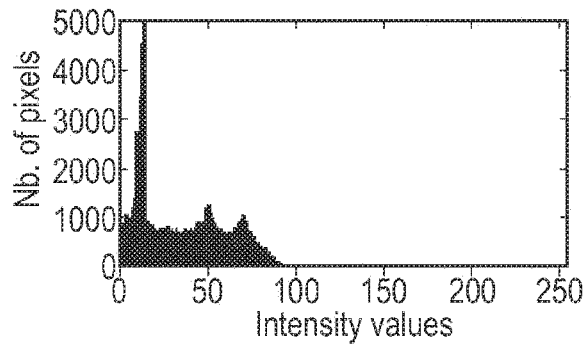
(b) Histogram of (a)
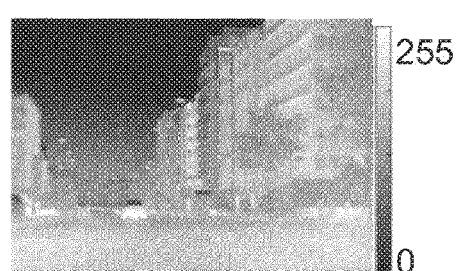
(c) O, (α=1, β=150)
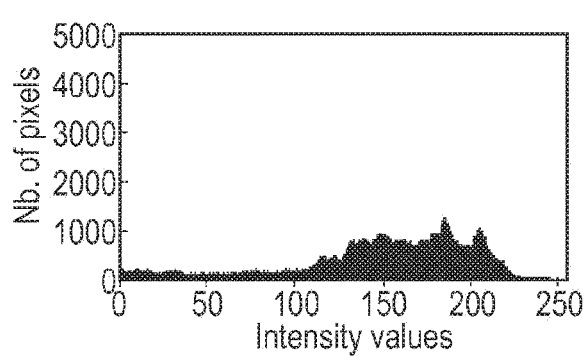
(d) Histogram of (c)
Fig. 8

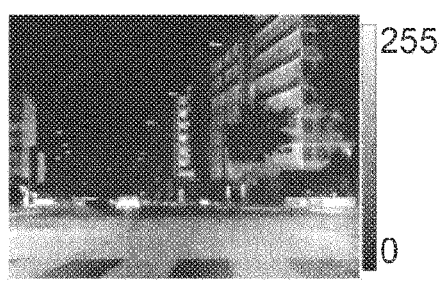 (a) O, (α=3, β=25)
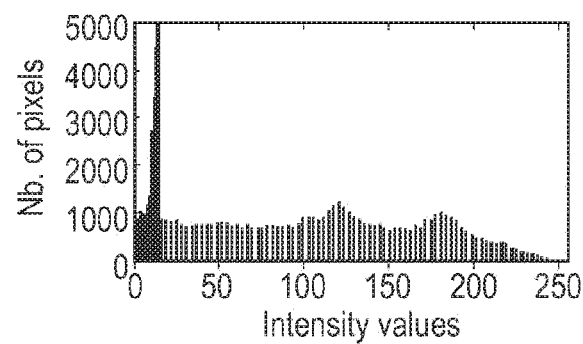 (b) Histogram of (a)
 (c) O, (α=3, β=150)
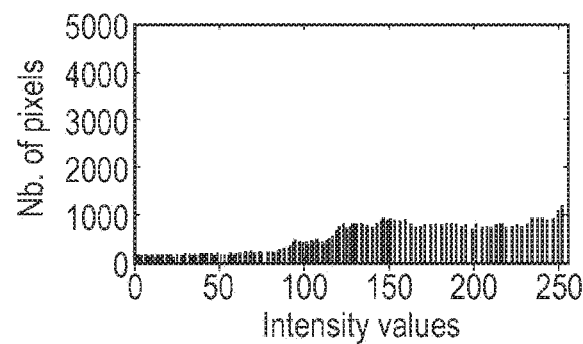 (d) Histogram of (c)
Fig. 9

METHOD AND SYSTEM FOR REAL-TIME NOISE REMOVAL AND IMAGE ENHANCEMENT OF HIGH-DYNAMIC RANGE IMAGES

TECHNICAL FIELD

The present invention relates to image processing, and more particularly to a method and system for real-time noise removal and image enhancement of high-dynamic range (HDR) images.

BACKGROUND ART

The present invention concerns the visualization of images captured in different spectral ranges, e.g., thermography images. Sensors for such imaging are commonly used in a wide range of applications such as: (1) night vision—pedestrian/animal detection in the automotive sector; (2) video surveillance; and (3) driver assistance systems using IR-based systems to handle the influence of external light sources, e.g., the sun. Other applications will be apparent to the skilled person.

It is often desired to display images captured with one dynamic range (e.g. HDR) on displays having a different (usually lower) dynamic range. A method for noise removal and image detail enhancement is typically needed that accounts for the limitations on display devices so as to effectively display HDR, e.g. infrared (IR) images. In this example, in order to represent real world scenes, IR images used to be represented by a HDR that generally exceeds the working range of common display devices (8 bits). Therefore, an effective HDR mapping without losing the perceptibility of details is needed.

There have been presented a vast number of image processing techniques to increase the image contrast, enhance image details and/or reduce the amount of noise. Although most of these techniques are intended for 8 bit still images, they can be adapted and/or combined to address the enhancement of IR image details whilst mapping its HDR into a proper range for display. Indeed, variations of gamma correction (GC) and histogram equalization (HE) approaches have been widely used to fit the raw data into an 8 bit data representation with an increase of the global contrast.

Recent IR image visualization approaches are strongly related to the enhancement of the details in the resulting 8 bit image representation. Glush et al. (S. W. Glushko and C. Salvaggio, "Quantitative analysis of infrared contrast enhancement algorithms," in Infrared Imaging Systems: Design, Analysis, Modeling, and Testing, 2007, pp. 65 430S: 1-12) limited the noise amplification by the so-called unsharp masking, a technique that defines a detail map to classify noise and detail pixels depending on the intensity of the detail. As suggested by Durand and Dorsey (F. Durand and J. Dorsey, "Fast Bilateral Filtering for the Display of High-Dynamic-Range Images," ACM Trans. Graph., vol. 21, no. 3, pp. 257-266, July 2002), bilateral filter (BF) has been widely used to define a detail map. Zuo et al. (C. Zuo, Q. Chen, N. Liu, J. Ren, and X. Sui, "Display and detail enhancement for high-dynamic-range infrared images," Optical Engineering, vol. 50, no. 12, pp. 127 401:1-9, 2011) addressed the gradient reversal artefact on their BF-based Digital Detail Enhancement (BF&DDE) filter by applying a Gaussian low pass filter on the resulting base image component. More recently, He et al. (K. He, J. Sun, and X. Tang, "Guided Image Filtering," IEEE Transactions on Pattern Analysis and Machine Intelligence, vol. 35, no. 6, pp. 1397-1409, June 2013) presented a new edge preserving filter, the so called guided filter (GF). As suggested by the authors, the GF might be also considered to define the detail map, instead of using the BF. Indeed, in contrast to the BF, GF does not suffer from the edge artefact and its processing time is significantly smaller.

A problem with known methods is how to achieve mapping of the HDR whilst preserving important image details for data representation in the 8 bits domain.

A further problem is how to identify/classify pixels representing image details and/or pixels that might present noise.

A further problem with known methods is how to achieve noise removal without attenuating or removing image details.

A further problem is how to avoid noise magnification in the detail enhancement process.

A further problem with known methods is how to enhance the global contrast of the IR image.

A further problem is how to avoid global brightness fluctuations from frame to frame (i.e., time consistency).

It is an object of the present invention to provide a system and method that address at least one of the foregoing problems and provide improved techniques for real-time noise removal and image enhancement of high-dynamic range (HDR) images.

SUMMARY

According to one aspect of the invention there is provided a method for real-time noise removal and image enhancement of high-dynamic range (HDR) images, the method comprising: receiving an input image I, the input image I comprising a HDR image; operating processing circuitry for applying a first edge-preserving filter to the input image I, thereby generating a first image component $B_1$ and a first set of linear coefficients $\bar{a}_{i,1}$; applying a second edge-preserving filter to the input image I, thereby generating a second image component $B_2$ and a second set of linear coefficients $\bar{a}_{i,2}$; generating a plausibility mask P from a combination of the first set of linear coefficients $\bar{a}_{i,1}$ and the second set of linear coefficients $\bar{a}_{i,2}$, the plausibility mask P indicating spatial detail within the input image I; and generating an output image O based on first image component $B_1$, the second image component $B_2$ and the plausibility mask P.

The first edge-preserving filter may comprise a detail preserving filter and the first image component $B_1$ may comprise the input image I in which image detail is preserved.

The second edge-preserving filter may comprise a noise removal filter and the second image component $B_2$ may comprise the input image I from which noise has been removed or reduced.

The first edge-preserving filter and/or the second edge-preserving filter may comprise a guided filter.

The plausibility mask P may be derived as $$P(i,j) = \frac{P'(i,j) - P'_{min}}{P'_{max} - P'_{min}},$$

where $P' = \bar{a}_{i,1} \cdot \bar{a}_{i,2}$ and $P'_{min}$ and $P'_{max}$ the minimum and maximum values of P', respectively.

The method may further comprise cropping P' before stretching its values according to $$P(i,j) = \frac{P'(i,j) - P'_{min}}{P'_{max} - P'_{min}}.$$

The cropping of P' may comprise applying $$P'(i,j) = \begin{cases} \overline{a}_{i,j}(i,j) \cdot \overline{a}_{i,2}(i,j) & \text{if } \overline{a}_{i,1}(i,j) \cdot \overline{a}_{i,2}(i,j) < \delta \\ \delta & \text{otherwise} \end{cases},$$

where, in this embodiment, $\delta=\mu+2\sigma$, $\mu$ the mean of $\overline{a}_{i,2}$ and $\sigma=\sqrt{\mu}$.

Generating an output image O may comprise generating an output image O based on the summation of the second image component $B_2$ and a detail image component D' derived from the first image component $B_1$ and the plausibility mask P. The detail image component may be given as $D'=\lambda P \cdot D$, where $D=B_1-B_2$, and $\lambda$ is a gain factor for adjusting the contrast of details in D.

The intermediate image O' may be derived by $O'=B_2+D'$.

Generating an output image O comprises applying a mapping of an intermediate image O' to output image O while preserving and enhancing the contrast of the image details in detail image component D'.

The mapping may comprise generating a histogram and a cumulative histogram of the grayscale value of each O'(i,j) within the intermediate image O'. The cumulative histogram might be characterized by three values, i.e., $\lambda_{min}$, $\lambda_{med}$, $\lambda_{max}$ which defined the position and boundaries of the cumulative histogram of O'·α, with α being a contrast level. In this embodiment, we define $\lambda_{min}$ at 1%, $\lambda_{med}$ at 50%, and $\lambda_{max}$ at 99% of the cumulative histogram.

The mapping may comprise classifying the grayscale value of each O'(i,j) within the intermediate image O' as left $O'_L(i,j)$ or right $O'_R(i,j)$ depending on its location within the histogram of O', such that $$O'_L(i,j)=O'(i,j)\cdot\alpha \text{ if } O'(i,j)\cdot\alpha<\lambda_{med}$$

$$O'_R(i,j)=O'(i,j)\cdot\alpha \text{ if } O'(i,j)\cdot\alpha\geq\lambda_{med}$$

where $\lambda_{med}$ corresponds to the location in the cumulative histogram of O'·α at, in this embodiment, 50%.

The mapping may comprise determining output image O from $$O(i,j) = \begin{cases} 0 & \text{if } (O'_L(i,j) \leq \lambda_{min}) \text{ and } (\lambda_{med} - \lambda_{min} > \beta) \\ \frac{(O'_L(i,j) - \lambda_{min}) \cdot \beta}{\lambda_{med} - \lambda_{min}} & \text{if } (O'_L(i,j) > \lambda_{min}) \text{ and } (\lambda_{med} - \lambda_{min} > \beta) \\ \max(0, O'_L - (\lambda_{med} - \beta)) & \text{if } (\lambda_{med} - \lambda_{min} \leq \beta) \\ (2^N - 1) & \text{if } (O'_R(i,j) > \lambda_{max}) \text{ and } (\lambda_{max} - \lambda_{med} > (2^N - 1) - \beta) \\ (O'_R(i,j) - \lambda_{med}) \cdot \frac{((2^N - 1) - \beta)}{\lambda_{max} - \lambda_{med}} + \beta & \text{if } (O'_R(i,j) \leq \lambda_{max}) \text{ and } (\lambda_{max} - \lambda_{med} > (2^N - 1) - \beta) \\ \min((2^N - 1), O'_R - (\lambda_{med} - \beta)) & \text{if } (\lambda_{max} - \lambda_{med} \leq (2^N - 1) - \beta) \end{cases}$$

where $\lambda_{min}$ and $\lambda_{max}$ correspond to the boundaries of the cumulative histogram of O'·α, and N is the number of bits defining the dynamic range of output image O.

In one embodiment, N=8 for 8 bit data representation within the range [0, 255].

The intermediate image O' may be a 12-bit or 14-bit image.

In one embodiment, for the first image component $B_1$ and the second image component $B_2$, each is derived using a linear transform of I in a window $w_k$ centered at pixel k, such that $$B_i = \overline{a}_i I_i + \overline{b}_i, \forall i \in w_k,$$

where $$\overline{a}_i = \frac{1}{|w|}\sum_{k \in w_i} a_k, \text{ with } a_k = \frac{\sigma_k^2}{\sigma_k^2 + \varepsilon},$$

$$\overline{b}_i = \frac{1}{|w|}\sum_{k \in w_i} b_k, \text{ with } b_k = (1 - a_k)\mu_k,$$

are linear coefficients assumed to be constant in $w_k$,
$\mu_k$ and $\sigma_k^2$ are the mean and variance of I in $w_k$,
|w| is the number of pixels in $w_k$, and
ε is a regularization parameter penalizing large $a_k$.

In one embodiment, the size of $w_k$ is 3×3, $\varepsilon_1=25$ and/or $\varepsilon_2=2500$.

According to another aspect of the invention there is provided a programmable image processing system when suitably programmed for carrying out the method of any of the preceding claims, the system comprising circuitry for receiving or storing an input image I and processing circuitry for performing the method.

According to another aspect of the invention there is provided a system for real-time noise removal and image enhancement of high-dynamic range (HDR) images, the system comprising: circuitry for receiving or storing an input image I, the input image I comprising a HDR image; and processing circuitry, coupled to the circuitry for receiving or storing an input image I, the processing circuitry being operable for applying a first edge-preserving filter to the input image I, thereby generating a first image component $B_1$ and a first set of linear coefficients $\overline{a}_{i,1}$; applying a second edge-preserving filter to the input image I, thereby generating a second image component $B_2$ and a second set of linear coefficients $\overline{a}_{i,2}$; generating a plausibility mask P from a combination of the first set of linear coefficients $\overline{a}_{i,1}$ and the second set of linear coefficients $\overline{a}_{i,2}$, the plausibility mask P indicating spatial detail within the input image I; and generating an output image O based on first image component $B_1$, the second image component $B_2$ and the plausibility mask P.

According to another aspect of the invention there is provided a recordable, rewritable or storable medium having recorded or stored thereon data defining or transformable into instructions for execution by processing circuitry and corresponding to at least the steps of any of claims 1 to 18 of the appended claims.

According to another aspect of the invention there is provided a server computer incorporating a communications device and a memory device and being adapted for transmission on demand or otherwise of data defining or transformable into instructions for execution by processing circuitry and corresponding to at least the steps of any of claims 1 to 18 of the appended claims.

In certain embodiments, two edge-preserving filters, e.g., the Bilateral Filter (BF) or the Guided Filter (GF), are combined to first generate accurate base and detail image components, and then a plausibility mask—to be used as an indicator of the spatial detail. The latter enables identification of those regions that are prominent to present noise in the detail image component. Finally, the working range of the HDR is filtered along time, to avoid global brightness fluctuations in the final 8 bit data representation, which results from combining both detail and base image components using a dedicated histogram projection method. This histogram projection method is, for example, adapted to requirements in the automotive sector.

An advantage of the invention is that in at least some embodiments it provides mapping of the HDR whilst preserving important image details for data representation in 8 bit domain.

A further advantage is that the base image component B2 that represents the HDR is mapped, whereas image details from the enhanced D' image are enhanced/preserved.

A further advantage is that the techniques enable individual processing of HDR mapping and detail enhancement.

A further advantage is that identification/classification of pixels representing image details and/or pixels that might present noise is facilitated.

A further advantage is that noise removal without attenuating or removing image details is facilitated.

A further advantage is that the formulation of P ensures that only noise (low weighted pixels in P) will be removed.

A further advantage is to avoid noise magnification in the detail enhancement process.

A further advantage is that, as noisy pixels are low weighted in P, they will not be magnified after applying the gain factor.

A further advantage is to enhance the global contrast of an IR image.

A further advantage is that, through the use of a novel histogram projection approach, in addition to effectively mapping the HDR to the 8 bit domain, it allows the user to adjust both contrast and brightness levels without generating undesired artifacts such as noise or image distortion.

A further advantage is to avoid global brightness fluctuations from frame to frame (time consistency).

A further advantage is that the maximum and minimum values to which the resulting 8 bit image is mapped are computed from a temporal statistical stabilization. By doing so global brightness fluctuations between frames is avoided.

BRIEF DESCRIPTION OF THE DRAWINGS

Preferred embodiments of the invention will now be described, by way of example, with reference to the accompanying drawings, in which:

FIG. 1 shows a flow diagram of the method for real-time noise removal and image enhancement (TDDE filter) according to the embodiments of the invention;

FIG. 2 illustrates (a) a raw input image I, (b) a first image component $B_1$ generated by guided filter $GF_1$ in the method of FIG. 1, and (c) a second image component $B_2$ generated by guided filter $GF_2$ in the method of FIG. 1;

FIG. 3 shows (a) the first linear coefficients $\bar{a}_{i,1}$ resulting from $GF_1$ on the input image I from FIG. 2(a), (b) the histogram for $\bar{a}_{i,1}$, (c) the second linear coefficients $\bar{a}_{i,2}$ resulting from $GF_2$ on the input image I from FIG. 2(a), (d) the histogram for $\bar{a}_{i,2}$, (e) plausibility mask P in the method of FIG. 1, and (f) the histogram for P;

FIG. 4 shows detail image component (a) D of FIG. 1 resulting from the difference between $B_1$ and $B_2$ in FIG. 2, and (b) the resulting D' of FIG. 1 after noise masking and detail magnification; and FIGS. 5 to 9 illustrate the disclosed histogram projection method for different test cases using real scenes.

DESCRIPTION OF PREFERRED EMBODIMENTS

As used herein, the "images" or "image signals" may be analog or digital, and may be subject to conventional analog or digital filtering.

Where references are made herein to steps, operations or manipulations involving "images", etc., these are implemented, where appropriate, by means of operations upon electronically processable representations (e.g. captured stills of video frame signals, bitstream video data, MPEG files or video streams, PC-video, or any other capturable or viewable image data format) of such "images".

Where references are made herein to steps, operations or manipulations involving "images", "image signals" or "image data", these may be implemented, where appropriate, by means of software controlled processor operations, hardware circuitry or any suitable combination of these.

While the implementation described herein is suitably embodied in a computer system, it may be incorporated in an adaptor, an image processor, or any other equipment located between or incorporating an image source and a display device (e.g. LCD, Plasma, projector, etc.), or in the display device itself. The computer system suitably comprises a processor coupled (where appropriate via DACs and ADCs, or other interfaces) to RAM, ROM, storage devices, image capture and/or image storage devices, display driver and display devices, data communication and other peripherals, as is well known to persons skilled in the art; therefore, these will not be illustrated or discussed further.

FIG. 1 shows a flow diagram of the method for real-time noise removal and image enhancement (TDDE filter) according to an embodiment of the invention. An input image I is fed to both a detail enhancement guided filter $GF_1$ and a noise removal guided filter $GF_2$. Resulting from detail enhancement guided filter $GF_1$ is a first image component $B_1$ and first linear coefficients $\bar{a}_{i,1}$. Resulting from noise removal guided filter $GF_2$ is a second image component $B_2$ and second linear coefficients $\bar{a}_{i,2}$. The first linear coefficients $\bar{a}_{i,1}$ and second linear coefficients $\bar{a}_{i,2}$ are combined to form plausibility mask P, as discussed in further detail below. As also discussed in further detail below subtraction element 2 generates $D=B_1-B_2$, multiplication element 4 generates $D'=\lambda P \cdot D$, summing element 6 generates $O'=B_2+D'$, and mapping element 8 generates the final output image O by mapping O' to O, the latter being an 8-bit image.

In order to address the abovementioned problems, the present invention, at least in some embodiments, involves the use of a so-called Temporal DDE (TDDE) filter. In general, known DDE-based filters rely on a single edge-preserving filter, e.g., BF or GF, to separate the B image component, which contains the HDR to be effectively mapped, from the D image component that presents tiny variations corresponding to fine image details to be preserved and enhanced in the resulting 8 bit image representation. The TDDE filter according to one or more embodiments of the invention includes the GF in its design as the GF presents a better behavior near edges than the BF, with a major advantage of being a fast and non-approximate linear time algorithm, regardless of the kernel size and the intensity range. The latter enables real-time performance. In addition, the GF does not suffer from the gradient reversal artefacts, as with the BF. The TDDE filter according to one or more embodiments of the invention relies not only on a single but on two dedicated GFs when computing both B and D image components.

With regard to the GF, to assist understanding of the way in which each GF, i.e., $GF_1$ and $GF_2$, is parameterized, to respectively preserve details ($B_1$) and remove noise ($B_2$), these will be discussed briefly. In general, the B image component corresponds to the edge-preserving smoothed image that results from the GF, a linear transform of I in a window $w_k$ centered at pixel k, i.e., $$B_i = \bar{a}_i I_i + \bar{b}_i, \forall i \in w_k, \quad (1)$$

where $$\bar{a}_i = \frac{1}{|w|} \sum_{k \in w_i} a_k, \text{ with } a_k = \frac{\sigma_k^2}{\sigma_k^2 + \varepsilon}, \quad (2)$$

$$\bar{b}_i = \frac{1}{|w|} \sum_{k \in w_i} b_k, \text{ with } b_k = (1 - a_k)\mu_k, \quad (3)$$

are linear coefficients assumed to be constant in $w_k$, $\mu_k$ and $\sigma_k^2$ are the mean and variance of I in $w_k$, $|w|$ is the number of pixels in $w_k$, and $\varepsilon$ is a regularization parameter penalizing large $a_k$.

The selection of the $w_k$ size may be done depending on the minimum size of the details to be preserved in I. A small $w_k$ size may be chosen, e.g., 3×3, in order to preserve and enhance fine image details such as trees' leaves. The smoothing level is given by the $\varepsilon$ parameter. That is, if $\varepsilon$ is set too small, not only image details are preserved but also noise and tiny structures in the image. Contrarily, if $\varepsilon$ is set too large, noise will be totally removed together with all image details.

Therefore, $GF_1$ is configured with a very small $\varepsilon_1$ value, e.g., $\varepsilon_1=25$, from which results a $B_1$ image component slightly smoother than I, containing the image details to be present in the final 8 bit representation. On the other hand, $GF_2$ is configured with an $\varepsilon_2$ value large enough to totally remove the noise, e.g., $\varepsilon_2=2500$, from which the base image component $B_2$ is obtained. Inevitably, noise will be present in $B_1$, whereas image details will be totally removed in $B_2$.

FIG. 2 illustrates (a) a raw input image I, (b) a first image component $B_1$ generated by guided filter $GF_1$ in the method of FIG. 1, and (c) a second image component $B_2$ generated by guided filter $GF_2$ in the method of FIG. 1. FIG. 2(a) presents the selected input image I to illustrate the behavior of the GF when configured with $\varepsilon_1$ or $\varepsilon_2$. Regarding the $w_k$ size, it is noted that it may be small enough, e.g., k=3, in order to preserve small image details such as trees' leaves. Preferably, $w_k$ size is the same in both $GF_1$ and $GF_2$ in order to avoid non desired artefacts when computing the plausibility mask P (FIG. 1).

FIG. 3 shows (a) the first linear coefficients $\bar{a}_{i,1}$ resulting from $GF_1$ on the input image I from FIG. 2(a), (b) the histogram for $\bar{a}_{i,1}$ (c) the second linear coefficients $\bar{a}_{i,2}$ resulting from $GF_2$ on the input image I from FIG. 2(a), (d) the histogram for $\bar{a}_{i,2}$, (e) plausibility mask P in the method of FIG. 1, and (f) the histogram for P.

In order to exploit the advantages of each GF while avoiding their individual drawbacks, a new plausibility mask P is used that combines the linear coefficients $\bar{a}_{i,1}$ and $\bar{a}_{i,2}$ that result from each $GF_1$ and $GF_2$, respectively. The aim of P is to weight image details as in $\bar{a}_{i,1}$ (see FIG. 3(a)), in contrast to weighting noisy pixels as in $\bar{a}_{i,2}$ (see FIG. 3(c)). To do so, P is defined as $$P(i,j) = \frac{P'(i,j) - P'_{min}}{P'_{max} - P'_{min}}, \quad (4)$$

where $P'=\bar{a}_{i,1} \cdot \bar{a}_{i,2}$ and $P'_{min}$ and $P'_{max}$ are the minimum and maximum weight values of P', respectively. It is noted that the product of $\bar{a}_{i,1}$ and $\bar{a}_{i,2}$ will globally reduce the weights along edges, and thus it may significantly reduce or even remove image details in the final 8 bit image. To avoid that, P' is preferably cropped before stretching its values in (4), i.e., $$P'(i,j) = \begin{cases} \bar{a}_{i,1}(i,j) \cdot \bar{a}_{i,2}(i,j) & \text{if } \bar{a}_{i,1}(i,j) \cdot \bar{a}_{i,2}(i,j) < \delta \\ \delta & \text{otherwise} \end{cases}, \quad (5)$$

where $\delta=\mu+2\sigma$, $\mu$ is the mean of $\bar{a}_{i,2}$ and $\sigma=\sqrt{\mu}$, as the noise in $\bar{a}_{i,2}$ follows a Poisson distribution (see FIG. 3(d)).

FIG. 4 shows detail image component (a) D of FIG. 1 resulting from the difference between $B_1$ and $B_2$ in FIG. 2, and (b) the resulting D' of FIG. 1 after noise masking and detail magnification.

The TDDE filter according to one or more embodiments of the invention does not consider the input image I when computing the D image component, but rather the $B_1$ image component that results from $GF_1$, i.e., a slightly smoother version of I that preserves all image details with a slight reduction of noise, i.e., $D=B_1-B_2$. However, this straightforward computation of D not only retains tiny details but also the noise in $B_1$, as illustrated in FIG. 4(a). According to human perception characteristics, noise within smooth image regions can be easily perceived by the observer as spuriousness or texture, whereas it is almost imperceptible along sharp edges. Taking that into account, the noise is masked depending on the spatial detail, i.e., using the plausibility mask P. Indeed, P clearly reflects the spatial detail of the input image I, enabling differentiation of those regions presenting image details in $B_1$ from those regions that are prominent to contain noise. According to embodiments, the detail image component D' is defined as $$D'=\lambda P \cdot D \quad (7)$$

where $\lambda$ is a gain factor to increase, if desired, the contrast of the details in D. FIG. 4(b) presents the resulting D' image component after being masked by P.

The final 8 bit enhanced image O results from mapping the sum of the generated $B_2$ image component and the enhanced D' image component, i.e., $O=\lfloor B_2 \; D' \rfloor$, to the 8 bit domain (in mapping element 8 in FIG. 1). The operator $\lfloor \bullet \rfloor$ denotes the mapping to the 8 bit domain. To do the mapping, either extended Histogram Equalization (HE) or Automatic Gain Control (AGC) based techniques are commonly used in known systems. However, whereas AGC-based approaches just remove extreme values and linearly map the HDR onto the 8 bit domain, HE-based approaches simply increase the contrast in the dominating temperature range. That is, more dynamic range is provided to the dominating temperature range and less dynamic range to image regions in the non-dominating temperature range. However, a problem occurs if the image details to be preserved/enhanced are not in that dominating range. Another issue occurs when mapping HDR images with an active data range smaller than the display range. In the case of images from an IR camera, this is a situation that occurs when the IR camera is facing a uniform background or the cloudless sky. In such cases, the resulting mapped image will be distorted and full of noise due to the linear extension of the narrow active range.

In order to overcome the aforementioned drawbacks, alternative known DDE-based filters first map the HDR of the $B_2$ image component to the 8 bit domain and then generate the final O image by adding D', i.e., $O=\lfloor B_2 \rfloor + D'$. However, a problem is that the direct combination of the mapped $\lfloor B_2 \rfloor$ and D' yields to saturation in most of the cases, as pixel values of D' are considerable if compared to the 8 bit data range representation (see the data range representation in FIG. 4).

To address the aforementioned issues, in accordance with one or more embodiments of the invention a new histogram projection approach is used to effectively map the dynamic of $O'=B_2+D'$ (usually represented by 12 or 14 bits) into the 8 bit domain, while preserving and enhancing the contrast of the image details in D', regardless of the length of the $B_2$ active data range as well as the number of pixels that happen to be in. More particularly, first, the grayscale value of each $O'(i,j)$ are classified as left $O'_L(i,j)$ or right $O'_R(i,j)$ (or cold and warm) depending on its location within the histogram of O', i.e., $$O'_L(i,j) = O'(i,j) \cdot \alpha \text{ if } O'(i,j) \cdot \alpha < \lambda_{med} \qquad (8)$$

$$O'_R(i,j) = O'(i,j) \cdot \alpha \text{ if } O'(i,j) \cdot \alpha \geq \lambda_{med} \qquad (9)$$

with $\lambda_{med}$ corresponding to the location of the cumulative histogram of $O' \cdot \alpha$ at, in this embodiment, 50% and $\alpha$ being the contrast level, a parameter through which the operator can adjust how wide a range of temperature will be mapped into the gray scale of the display device. A low contrast level defines a wide temperature span (HDR) in which low contrast variations are not visible. In contrast, a high contrast level defines a narrow temperature span (LDR) in which low contrast variations become visible.

A second parameter to be used is $\beta$, the brightness level from which the user can adjust the center temperature of the display device. A low brightness level defines a colder scene in which only hot targets are displayed at full scale, i.e., in white hot. In contrast, a high brightness level defines a warmer scene with only cold targets displayed as black.

The final 8 bit enhanced image O results from $$O(i,j) = \begin{cases} 0 & \text{if } (O'_L(i,j) \leq \lambda_{min}) \text{ and } (\lambda_{med} - \lambda_{min} > \beta) \\ \dfrac{(O'_L(i,j) - \lambda_{min}) \cdot \beta}{\lambda_{med} - \lambda_{min}} & \text{if } (O'_L(i,j) > \lambda_{min}) \text{ and } (\lambda_{med} - \lambda_{min} > \beta) \\ \max(0, O'_L - (\lambda_{med} - \beta)) & \text{if } (\lambda_{med} - \lambda_{min} \leq \beta) \\ (2^N - 1) & \text{if } (O'_R(i,j) > \lambda_{max}) \text{ and } (\lambda_{max} - \lambda_{med} > (2^N - 1) - \beta) \\ \dfrac{(O'_R(i,j) - \lambda_{med}) \cdot ((2^N - 1) - \beta)}{\lambda_{max} - \lambda_{med}} + \beta & \text{if } (O'_R(i,j) \leq \lambda_{max}) \text{ and } (\lambda_{max} - \lambda_{med} > (2^N - 1) - \beta) \\ \min((2^N - 1), O'_R - (\lambda_{med} - \beta)) & \text{if } (\lambda_{max} - \lambda_{med} \leq (2^N - 1) - \beta) \end{cases} \qquad (8)$$

where $\lambda_{min}$ and $\lambda_{max}$ corresponding to boundaries of the cumulative histogram of $O' \cdot \alpha$. In this embodiment, N=8 for 8 bit data representation within the range [0, 255].

FIGS. 5 to 9 illustrate the disclosed histogram projection method using real scenes acquired by a prototype IR thermal camera that provides HDR IR images of (384_288) pixels. All reported results have been obtained using an Intel® Core™ i5-4200U CPU @ 1.60 GHz with an integrated graphic card Intel® HD Graphics 4400.

FIG. 5 shows the two real test cases that have been considered to evaluate the proposed approach. FIG. 5a is an extreme test case (Test 1) with a very narrow temperature span containing a very small target (human) on the bottom-right of the image. Conversely, the test case (Test 2) in FIG. 5c presents a scene with high temperature dynamics that must be effectively mapped into the 8 bit domain. The disclosed enhanced TDDE filter has been considered to illustrate the behavior of the proposed histogram projection mapping method. The following parameters have been used: k=3, $\varepsilon_1$=25, $\varepsilon_2$=2500, and $\lambda$=5.

FIG. 6 and FIG. 7 illustrate the behavior of the proposed HDR mapping method on the narrow temperature span of Test 1 depending on the contrast $\alpha$ and brightness $\beta$ parameters adjusted by the operator. From the figures we observe how the histogram is centered according to the center temperature defined by $\beta$. By adjusting $\alpha$, the operator can make discernible very small temperatures in the scene (see FIG. 7a). The behavior of the proposed mapping method on the wide temperature span of Test 2 is shown in FIG. 8 and FIG. 9. In this case, intensity values from $O'_L$ and/or $O'_R$ that lie outside of $(\lambda_{med} - \lambda_{min} > \beta)$ and/or $(\lambda_{max} - \lambda_{med} > (2^N - 1) - \beta)$, respectively, are linearly stretched along the entire 8 bit range.

While the use of the Guided Filter (GF) to split the input raw image is described herein, any other edge-preserving and noise-reducing smoothing filter for images might be used, such as the Bilateral Filter (BF).

While the use of the Histogram Projection method for 16 bits to 8 bits data conversion is described herein, alternative histogram equalization-based approaches might be used.

While the use of plural edge-preserving filters is described herein, in alternative embodiments a single GF or BF can be used to compute base and detail image components, as well as the plausibility mask. However, a trade-off (manually tuned) might be chosen between detail and noise removal.

While embodiments have been described by reference to embodiments having various components in their respective implementations, it will be appreciated that other embodiments make use of other combinations and permutations of these and other components.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for real-time noise removal and image enhancement of high-dynamic range HDR images, the method comprising:
   receiving an input image I, the input image I comprising a HDR image;
   operating processing circuitry for
      applying a first edge-preserving filter to the input image I, thereby generating a first image component $B_1$ and a first set of linear coefficients $\bar{a}_{i,1}$;
   said method is characterized by:
      applying a second edge-preserving filter to the input image I, thereby generating a second image component $B_2$ and a second set of linear coefficients $\bar{a}_{i,2}$, wherein the first edge-preserving filter and the second edge-preserving filter are distinct filters having different filtering characteristics such that the first image component $B_1$ is different than the second image component $B_2$, and the first set of linear coefficients $\bar{a}_{i,1}$ is different than the second set of linear coefficients $\bar{a}_{i,2}$;
   generating a plausibility mask P from a combination of the first set of linear coefficients $\bar{a}_{i,1}$ and the second set of linear coefficients $\bar{a}_{i,2}$, wherein the plausibility mask is derived as:

$$P(i,j)=P'(i,j)-P'_{min}$$

where $P' = \bar{a}_{i,1} \cdot \bar{a}_{i,2}$ and $P'_{min}$ and $P'_{max}$ the minimum and maximum weight values of P', respectively; and
   generating an output image O based on first image component $B_1$, the second image component $B_2$ and the plausibility mask P.

2. The method of claim 1, wherein the first edge-preserving filter comprises a detail preserving filter and the first image component $B_1$ comprises the input image I in which image detail is preserved.

3. The method of claim 1, wherein the second edge-preserving filter comprises a noise removal filter and the second image component $B_2$ comprises the input image I from which noise has been removed or reduced.

4. The method of claim 1, wherein the first edge-preserving filter and/or the second edge-preserving filter comprises a guided filter.

5. The method of claim 1, further comprising cropping P' before stretching its values according to $$P(i, j) = \frac{P'(i, j) - P'_{min}}{P'_{max} - P'_{min}}.$$

6. The method of claim 1, further comprising cropping P' according to $$P'(i, j) = \begin{cases} \bar{a}_{i,1}(i,j) \cdot \bar{a}_{i,2}(i, j) & \text{if } \bar{a}_{i,1}(i, j) \cdot \bar{a}_{i,2}(i, j) < \delta \\ \delta & \text{otherwise} \end{cases}.$$

where $\delta = \mu + 2\sigma$, $\mu$ the mean of $\bar{a}_{i,2}$ and $\sigma = \sqrt{\mu}$.

7. The method of claim 1, wherein generating an output image O comprises generating an output image O based on the summation of the second image component $B_2$ and a detail image component D' derived from the first image component $B_1$ and the plausibility mask P.

8. The method of claim 7, wherein the detail image component $D' = \lambda P \cdot D$, where $D = B_1 - B_2$, and $\lambda$ is a gain factor for adjusting the contrast of details in D.

9. The method of claim 7, wherein generating an output image O further comprises applying an intermediate image O' derived by $$O' = B_2 + D'.$$

10. The method of claim 1, wherein generating an output image O further comprises applying a mapping of an intermediate image O' to output image O while preserving and enhancing the contrast of the image details in a detail image component D'.

11. The method of claim 10, wherein the mapping comprises
   generating a histogram of the grayscale value of each O' (i,j) within the intermediate image O'.

12. The method of claim 10, wherein the mapping comprises
   classifying the grayscale value of each O'(i, j) within the intermediate image O' as left $O'_L(i,j)$ or right $O'_R(i, j)$ depending on its location within the histogram of O', such that $$O'_L(i,j) = O'(i,j) \cdot \alpha \text{ if } O'(i,j) \cdot \alpha < \lambda_{med}$$

$$O'_R(i,j) = O'(i,j) \cdot \alpha \text{ if } O'(i,j) \cdot \alpha \geq \lambda_{med}$$

where $\lambda_{med}$ corresponds to the location in the cumulative histogram of $O' \cdot \alpha$ at 50% and $\alpha$ is a contrast level.

13. The method of claim 10, wherein the mapping comprises determining output image O from $$O(i, j) = \begin{cases} 0 & \text{if } (O'_L(i, j) \leq \lambda_{min}) \text{ and } (\lambda_{med} - \lambda_{min} > \beta) \\ \frac{(O'_L(i, j) - \lambda_{min}) \cdot \beta}{\lambda_{med} - \lambda_{min}} & \text{if } (O'_L(i, j) > \lambda_{min}) \text{ and } (\lambda_{med} - \lambda_{min} > \beta) \\ \max(0, O'_L - (\lambda_{med} - \beta)) & \text{if } (\lambda_{med} - \lambda_{min} \leq \beta) \\ (2^N - 1) & \text{if } (O'_R(i, j) > \lambda_{max}) \text{ and } (\lambda_{max} - \lambda_{med} > (2^N - 1) - \beta) \\ \frac{(O'_R(i, j) - \lambda_{med}) \cdot ((2^N - 1) - \beta)}{\lambda_{max} - \lambda_{med}} + \beta & \text{if } (O'_R(i, j) \leq \lambda_{max}) \text{ and } (\lambda_{max} - \lambda_{med} > (2^N - 1) - \beta) \\ \min((2^N - 1), O'_R - (\lambda_{med} - \beta)) & \text{if } (\lambda_{max} - \lambda_{med} \leq (2^N - 1) - \beta) \end{cases}$$

where $\lambda_{min}$ and $\lambda_{max}$ correspond to the boundaries of the cumulative histogram of $O' \cdot \alpha$, and N is the number of bits defining the dynamic range of output image O.

14. The method of claim 13, wherein N=8 for 8 bit data representation within the range [0, 255].

15. The method of claim 9, wherein the intermediate image O' is a 12-bit or 14-bit image.

16. The method of claim 1, wherein for the first image component $B_1$ and the second image component $B_2$, each is derived using a linear transform of I in a window $w_k$ centered at pixel k, such that $$B_i = \bar{a}_i I_i + \bar{b}_v, \forall i \in w_k,$$

where $$\overline{a_i} = \frac{1}{|w|} \sum_{k \in w_i} a_k, \text{ with } a_k = \frac{\sigma_k^2}{\sigma_k^2 + \varepsilon},$$

$$\overline{b_i} = \frac{1}{|w|} \sum_{k \in w_i} b_k, \text{ with } b_k = (1 - a_k)\mu_k,$$

are linear coefficients assumed to be constant in $w_k$, $\mu_k$ and $\sigma k^2$ are the mean and variance of I in $w_k$, |w| is the number of pixels in $w_k$, and ε is a regularization parameter penalizing large $\alpha_k$.

17. The method of claim 16, wherein the size of $w_k$ is 3×3, $\varepsilon_1$ =25 and/or $\varepsilon_2$=2500.

18. A programmable image processing system when suitably programmed for carrying out the method of claim 1, the system comprising circuitry for receiving or storing an input image I and processing circuitry for performing the method.

19. A system for real-time noise removal and image enhancement of high-dynamic range HDR images, the system comprising:
   circuitry for receiving or storing an input image I, the input image I comprising a HDR image;
   processing circuitry, coupled to the circuitry for receiving or storing an input image I, the processing circuitry being operable for
      applying a first edge-preserving filter to the input image I, thereby generating a first image component $B_1$ and a first set of linear coefficients $\overline{a}_{i,1}$;
      applying a second edge-preserving filter to the input image I, thereby generating a second image component $B_2$ and a second set of linear coefficients $\overline{a}_{i,2}$, wherein the first edge-preserving filter and the second edge-preserving filter are distinct filters having different filtering characteristics such that the first image component $B_1$ is different than the second image component $B_2$, and the first set of linear coefficients $\overline{a}_{i,1}$ is different than the second set of linear coefficients $\overline{a}_{i,2}$;
      generating a plausibility mask P from a combination of the first set of linear coefficients $\overline{a}_{i,1}$ and the second set of linear coefficients $\overline{a}_{i,2}$, wherein the plausibility mask is derived as:

$P(i,j)=P'(i,j)-P'_{min}$ where $P' = \overline{a}_{i,1} \cdot \overline{a}_{i,2}$ and $P'_{min}$ and $P'_{max}$ the minimum and maximum weight values of P', respectively; and
      generating an output image O based on first image component $B_1$, the second image component $B_2$ and the plausibility mask P.

20. A non-transitory computer-readable medium having recorded or stored thereon data defining or transformable into instructions for execution by processing circuitry and corresponding to at least the steps of claim 1.

21. A server computer incorporating a communications device and a memory device and being adapted for transmission on demand or otherwise of data defining or transformable into instructions for execution by processing circuitry and corresponding to at least the steps of claim 1.

* * * * *